(12) United States Patent
Moore et al.

(10) Patent No.: US 12,107,961 B2
(45) Date of Patent: Oct. 1, 2024

(54) CONNECTION RESILIENT MULTI-FACTOR AUTHENTICATION

(71) Applicant: International Business Machines Corporation, Armonk, NY (US)

(72) Inventors: David Moore, Robina (AU); Leo Michael Farrell, Tamborine Mountain (AU); Philip Alan John Nye, Southport (AU)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 17/214,817

(22) Filed: Mar. 27, 2021

(65) Prior Publication Data

US 2022/0311616 A1    Sep. 29, 2022

(51) Int. Cl.
*H04L 9/32*    (2006.01)
*G06F 21/60*   (2013.01)
*H04L 9/30*    (2006.01)

(52) U.S. Cl.
CPC .......... *H04L 9/3226* (2013.01); *G06F 21/602* (2013.01); *H04L 9/30* (2013.01)

(58) Field of Classification Search
CPC ........ H04L 9/3226; H04L 9/30; G06F 21/602
See application file for complete search history.

(56) References Cited

U.S. PATENT DOCUMENTS

| | | | |
|---|---|---|---|
| 10,305,901 B2 | 5/2019 | Evans | |
| 10,361,849 B2 | 7/2019 | Smith et al. | |
| 10,547,600 B2 | 1/2020 | Murthy et al. | |
| 10,951,606 B1 * | 3/2021 | Shahidzadeh | H04W 4/029 |
| 2015/0310188 A1 * | 10/2015 | Ford | H04L 63/101 726/28 |
| 2016/0241389 A1 * | 8/2016 | Le Saint | H04L 9/0844 |
| 2017/0126642 A1 * | 5/2017 | Basin | H04L 9/3226 |

(Continued)

FOREIGN PATENT DOCUMENTS

| | | |
|---|---|---|
| CN | 111464512 A | 7/2020 |
| CN | 112260995 A | 1/2021 |

(Continued)

OTHER PUBLICATIONS

International Search Report and the Written Opinion, PCT/CN2022/076483, International Filing Date Feb. 16, 2022, 9 pages.

(Continued)

*Primary Examiner* — Ali S Abyaneh
*Assistant Examiner* — Zoha Piyadehghibi Tafaghodi
(74) *Attorney, Agent, or Firm* — Jordan T. Schiller

(57) ABSTRACT

A first authenticator payload is obtained that includes a first authenticator random value. A first authenticator encrypted file is generated with an authenticator public key that is related to a client authenticator application. The first authenticator encrypted file is generated based on a first cryptographic algorithm. The first authenticator encrypted file includes the first authenticator payload. A first target payload is obtained that includes a first target random value. A first target encrypted file is generated with the first authenticator random value. The first target encrypted file is generated based on a second cryptographic algorithm. The first target encrypted file includes the first target payload.

20 Claims, 9 Drawing Sheets

(56) References Cited

U.S. PATENT DOCUMENTS

2017/0339439 A1* 11/2017 Zhang .............. H04N 21/23895
2019/0386969 A1* 12/2019 Verzun .................. G06F 21/606
2020/0112557 A1    4/2020 Mccullough, IV et al.

FOREIGN PATENT DOCUMENTS

| CN | 112313983 A   | 2/2021 |
| CN | 112559987 A   | 3/2021 |
| WO | 2019226115 A1 | 11/2019 |

OTHER PUBLICATIONS

Duo Authentication for Windows Logon and RDP, Cisco, Dec. 22, 2020.
Mell, P. et al., "The NIST Definition of Cloud Computing", Recommendations of the National Institute of Standards and Technology, NIST Special Publication 800-145, 7 pages, Sep. 2011.

* cited by examiner ized Multi-Factor
CONNECTION RESILIENT MULTI-FACTOR AUTHENTICATION

BACKGROUND

The present disclosure relates to data security, and more specifically, to authentication of a target machine during variable network availability.

Authentication of a computer system through providing login credentials may be one way to provide security of the computer system. Login credentials may be combined with additional factors to increase the security of a computer system. The additional factors may rely on network availability to succeed.

SUMMARY

According to embodiments, disclosed are a method, system, and computer program product.

A first authenticator payload is obtained that includes a first authenticator random value. A first authenticator encrypted file is generated with an authenticator public key that is related to a client authenticator application. The first authenticator encrypted file is generated based on a first cryptographic algorithm. The first authenticator encrypted file includes the first authenticator payload. A first target payload is obtained that includes a first target random value. A first target encrypted file is generated with the first authenticator random value. The first target encrypted file is generated based on a second cryptographic algorithm. The first target encrypted file includes the first target payload.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
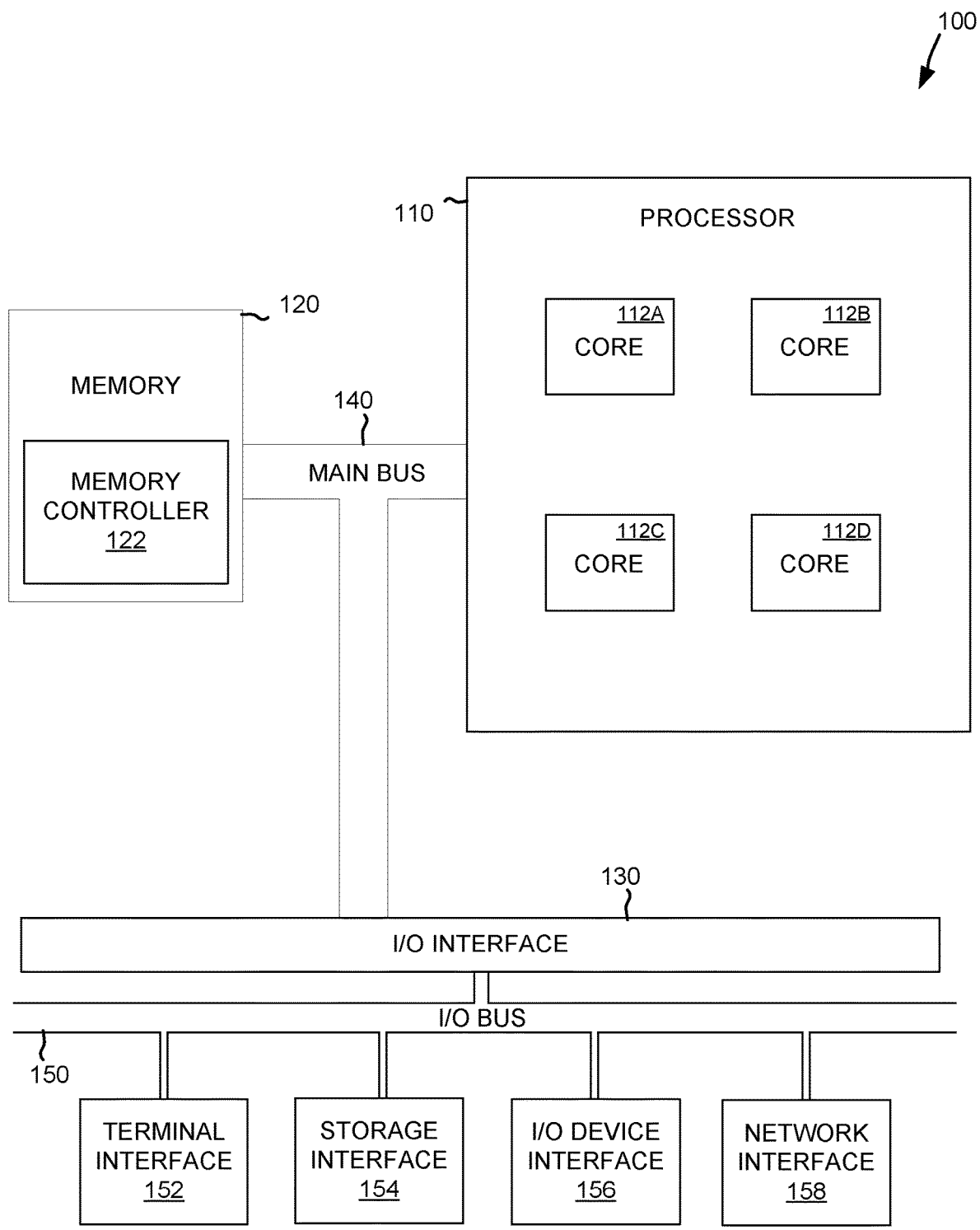
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data security; more particular aspects relate to authentication of a target machine during variable network availability. While the present disclosure is not necessarily limited to such applications, various aspects of the disclosure may be appreciated through a discussion of various examples using this context.

Modern computer systems are becoming an increasingly prevalent tool for the purpose of data creation, consumption, storage, and sharing. For instance, individuals may have data (e.g., bank-account information, private conversations, medical information) that is stored, shared, or otherwise accessed by computer systems. In another instance, organization entities (e.g., financial institutions, hospitals, governmental entities) may be responsible for generating, collecting, storing, or safe-guarding data. The livelihood of various individuals may be reliant on adequate data security. For instance, an organization or individual may suffer significant financial or other loss if data is not kept private or otherwise adequately secured.

One way that computer systems attempt to perform data security is through single-factor authentication. For instance, an operating system (e.g., macOS, Unix, Windows) may enact a particular scheme, challenge, or set of computer operations to perform single-factor authentication. In such computer operations, an entity (e.g., a client device, a user computer, a user) may be presented with a request for an identity and a first factor to verify that identity. The identity may be a username or serial number that is associated with the user. The first factor may be a piece of information known by the entity, such as a password or passphrase. Another first factor may be a piece of information that describes or is related to the entity itself, such as biometric data (e.g., a fingerprint of a user, a three-dimensional model of a user) or machine data (e.g., a serial number of a computer system, the amount of memory installed in a computer system).

To increase security, computers may utilize multi-factor authentication (MFA). MFA may include requesting a second or additional factors, information, or challenges. The additional factors of MFA may increase security in that a computer system is only responsive if all the factors are provided (e.g., providing a username, password, and second factor together). MFA may be improved by having the additional factors stored on a separate device. For instance, an MFA secured computer system ("target machine") may request a factor that is stored or provided by a second client device (e.g., a smartphone of a user). These second factor devices may be named "authenticators". Various examples of MFA include time-based one-time passwords (TOTP) and push authentication.

In many MFA configurations, the various factors may be performed by one or both of the device being accessed ("target machine") (e.g., the computer a user is attempting to log into) and a secondary MFA device, and each of the target machine and the secondary MFA device coordinating with a third external verification service such as a central or remote authentication/verification server ("authentication server"). In most of the MFA configurations, security practices may prioritize the target machine to obtain its MFA verification result from a trusted external authentication service via network communication (e.g., an authentication server). In detail, a user attempts to log into a target machine that is on a network connection to other computers (e.g., the Internet). The user provides a username and a password to the target machine. The target machined may include a deployed authentication module or suite of libraries (e.g., Windows Credential Provider, Unix Pluggable Authentication Modules) to communicate with an outside machine, such as an authentication server. Somewhat contemporaneously, the user's secondary computer (e.g., smartphone, personal laptop) is provided with a second factor and the target machine also is provided with the second factor through the network connection. The user may provide the second factor received from the secondary computer to the target machine. The target machine may then verify the identity using the first factor and the second factor.

Many MFA technologies have some drawbacks. One drawback may be the need for an online connection. Specifically, some MFA operations rely on a network connection. These online-based MFA technologies may operate properly during times of online connectivity. However, an online-based MFA cannot complete during periods where connectivity between the target machine and the authentication server is unavailable. Further, the fallback operations for online-based MFA may also not be ideal. One fallback includes denying access to the target machine. While it may be more secure to deny access to the target machine it can become impractical or provide for a technical hurdle that is unacceptable. For example, a target machine may need to be accessed to perform some kind of administration, such as during a downtime or servicing. If this downtime coincides with network unavailability the target machine may not be able to be accessed or logged into. Another fallback may be to skip MFA operations and permit access during a network outage or downtime. There are issues with this as well in that it become a security issue, and may be used to bypass the security by a third-party. For example, a malicious user may prevent a target machine from accessing a network connection to force the target machine to skip MFA operations and permit access based on a single factor.

Another drawback may be a shared secret that is potentially accessible if any device in the MFA chain is compromised. Specifically, TOTP MFA may operate by sharing a second factor that is initially static. For example, a particular static value is shared among an authentication server, a target machine, and/or a secondary computer used for MFA. The static value is then placed into a time-based algorithm such that the value changes regularly (e.g., every 30 seconds) among all devices. Each device to participate in TOTP would need the initial static value as well as the algorithm to update the static value at the predefined regular interval. If one device is compromised, that second factor (i.e., the static value and TOTP algorithm) may be obtained by a third party. The third party that obtains the second factor may then be able to impersonate a secondary computer of a TOTP MFA and access a target machine.

Connection resilient multi-factor authentication (CRMFA) may operate to alleviate other security techniques. CRMFA may enforce an MFA scheme between an authentication server, a target machine, and an authenticator application running on a secondary computer ("authenticator app"). CRMFA may alleviate insecurity and/or access issues of MFA between a server, target machine, an authenticator app even during times of network instability or network outages. CRMFA may leverage a pairing (e.g., a cryptographic pairing) of the various MFA devices. The MFA devices may include the target machine, the authentication server, and the authenticator app. The MFA devices leveraging CRMFA may have advantages over TOTP operations, such as not sharing a shared secret. By not sharing a secret, CRMFA may be secure, even if one of the MFA devices is compromised or otherwise accessed by a malicious entity.

CRMFA may operate by sharing encrypted values from the authentication server to the other MFA devices during an online connection (e.g., during network connectivity, during an online MFA). The encrypted values may be different encrypted values for each of the other MFA devices. Specifically, the target machine may receive one or more target encrypted files that contain target random values. The target machine may not be able to initially decrypt the encrypted files. For example, the target machine may receive and store the target encrypted files, but may not in isolation be able to obtain, decrypt, or otherwise access the target random values. The authenticator app, sometimes running on a separate computing device, may receive one or more authenticator encrypted files that contain authenticator random values. The authenticator encrypted files may be accessible by the authenticator app. For example, a public key (that is part of a public key/private key pair) is given by the authenticator app to the central authentication service, such as during a registration ceremony. The authenticator service may encrypt the authenticator encrypted files with the public key. The authenticator app may decrypt the authenticator encrypted files using the private key to obtain the authenticator random values. The authenticator app may then possess the authenticator random values that are the key to unlocking the target encrypted files. Consequently, a target machine may only be able to verify the contents of a target encrypted file as part of CRMFA by providing the target encrypted file to the authenticator app for decryption.

CRMFA may also be resilient to offline attacks. Specifically, the authentication server may only supply a limited number of encrypted files containing random values to each of the other MFA devices. For example, the authenticator app and the target machine may be configured to attempt to only use an encrypted file, a given authenticator encrypted file and a given target encrypted file, only a single time. After a single attempt, the authenticator app and/or the target machine may be configured to delete the encrypted files, so future attempts at performing MFA offline may not be possible. CRMFA may also be configured to be self-expirable, such that each encrypted file may also be expirable as part of CRMFA. Specifically, each target encrypted file and authenticator encrypted file may also contain an expiration value, and the target machine and/or authenticator app may be configured only to operate based on a random value that is not yet expired. If an encrypted file is expired, an authenticator app and/or target machine may be configured to invalidate and/or delete all data associated with the encrypted file. Later, when network availability to a central authentication server is restored, CRMFA may generate a new set of encrypted files proactively (e.g., before another network outage or unavailability occurs).

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100— including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
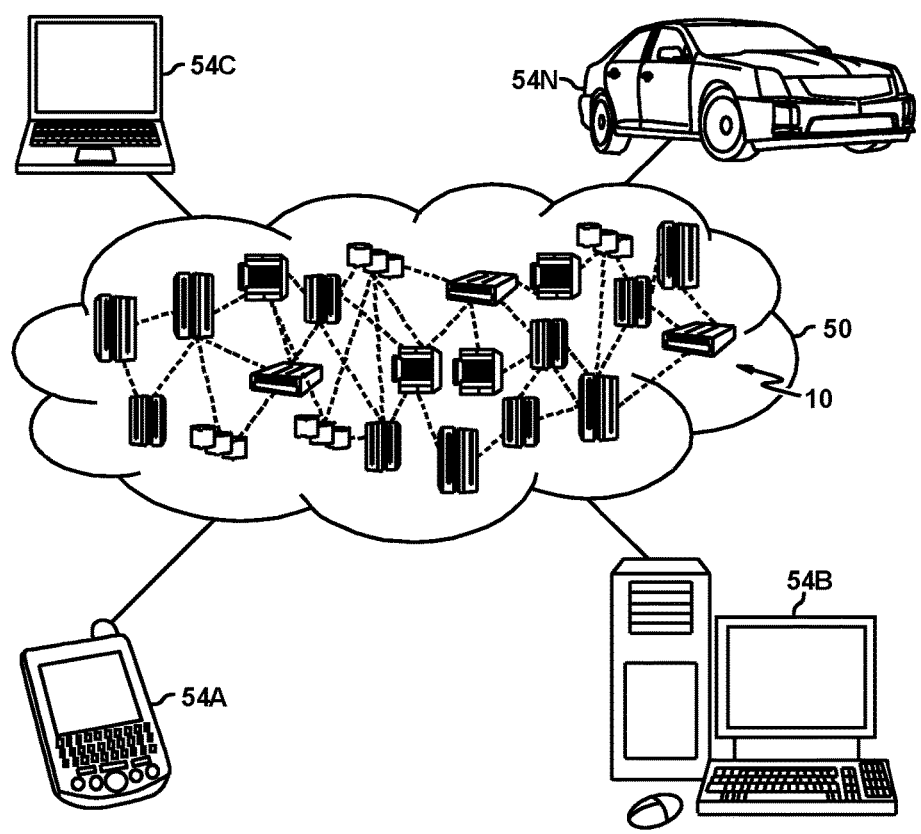
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
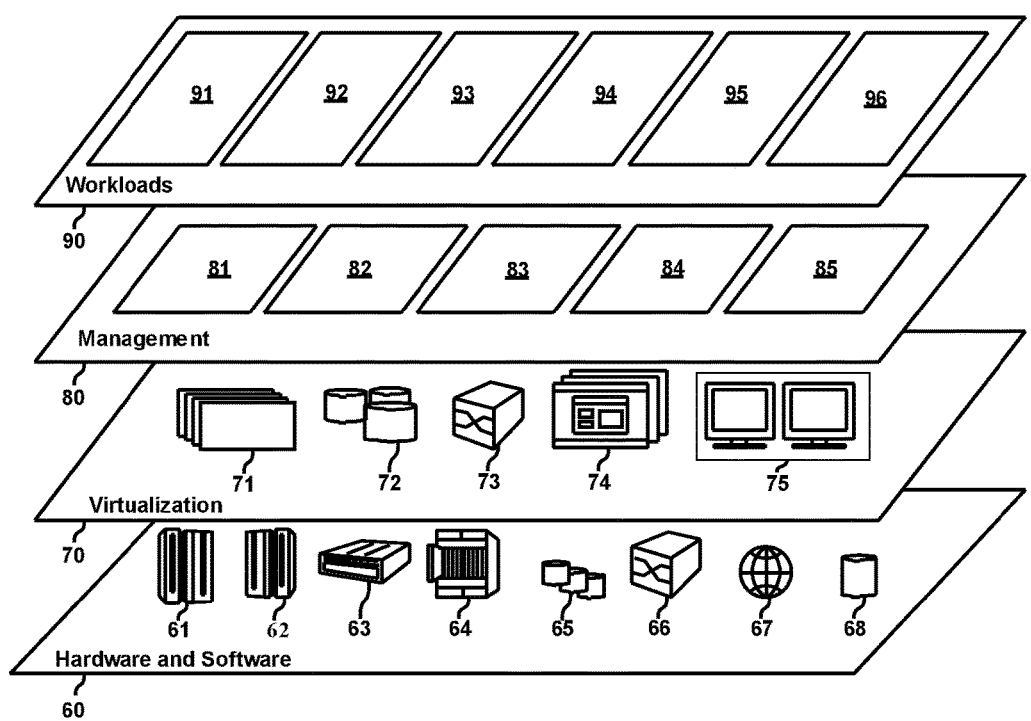
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CRFMA 96.

FIGS. 4A-4G depict an example system 400 of multi-factor authentication, consistent with some embodiments of the disclosure. System 400 may be configured to perform CRMFA to enable multi-factor authentication during times of variable network availability. For example, CRMFA may provide encrypted random values used for MFA that may enable various MFA devices to operate during times when a network is unavailable. System 400 may include one or more of the following: an authentication server 410; one or more networks, including networks 420-1 and 420-2 (collectively, network 420); an authenticator app 430; and a target machine 440.

Authentication server 410 may be a computer system configured to perform one or more CRMFA operations. Authentication server 410 may be a singular computer that includes I/O, memory, and processing, such as computer system 100. Authentication server 410 may be an abstracted resource based on multiple computers, such as cloud computing environment 50. Authentication server 410 may be configured to process one or more operations of MFA. Specifically, authentication server 410 may operate by performing a relevant cryptographic algorithm to generate various encrypted files (e.g., secure hash algorithms, cryptographic hash functions, RIPEMD functions). Authentication server 410 may also be configured to generate one or more random values (e.g., random strings, random characters, random numbers).

Network 420 may be configured as a singular network, such as a local area network, wide area network, or another relevant network. Network 420 may be configured as a wired network (e.g., IEEE 802.3). Network 420 may be configured as a wireless network (e.g., IEEE 802.11). Network 420 may include multiple separate networks, such as network 420-1 and 420-2 that are used for different MFA devices of system 400. For example, authenticator app 430 may communicate through network 420-1, and network 420-1 may be a cellular network. Continuing the example, target machine 440 may communicate through network 420-2, and network 420-2 may be a wired network. Consequently, authenticator app 430 and target machine 440 may not communicate directly with each other during performance online MFA, e.g., communication may be performed indirectly through authentication server 410.

Authentication app 430 may be an application, service, software, hardware, or other combination operating on a secondary computing device. Application app 430 may be a part of a computer system, such as a laptop PC, a smartphone, tablet computer, or other relevant computer (e.g., computer system 100). Authenticator app 430 may be configured to provide to a user an additional factor of an online MFA operation. For example, authenticator app 430 may receive from authentication server 410 a secondary factor, and responsively may present the secondary factor through a display (not depicted) for a user to provide to target machine 440. Authenticator app 430 may be configured to perform public-key or asymmetric cryptography. For example, authenticator app 430 may include a public key 432 and a private key 434, and authenticator app 430 may provide to other computing devices the public key 432 for use in encrypting data that may be later decrypted using private key 434.

Target machine 440 may be a computer system, such as a server, laptop PC, desktop computer, or other secured computer system (e.g., a computer protected with a username and a password). Target machine 440 may be configured to perform one or more MFA techniques in addition to being secured by a first factor (e.g., username and password). Specifically, target machine 440 may receive from authentication server 410 a second factor (e.g., a second factor challenge), and target machine 440 may be configured to prompt (e.g., a user, a secondary computer) for the second factor. Target machine 440 may be configured to receive the second factor and compare the second factors to authenticate access. In some embodiments, the target machine 440 may be configured to receive the second factor and send it to authentication server 410 for verification. The second factor authentication access may be successful if authentication server 410 returns a successful response to the target machine 440. Target machine 440 may be configured to perform public-key or asymmetric cryptography. For example, target machine 440 may include a public key 442 and a private key 444, and target machine 440 may provide to other computing devices the public key 442 for use in encrypting data that may be later decrypted using private key 444. Public key 442 may also be used by other computing devices to validate data signatures, such as data cryptographically signed by target machine 440 with private key 444.

System 400 may also be configured to perform CRMFA to provide for MFA during network outages. In some embodiments, CRMFA may be performed without any user interaction. Specifically, system 400 may operate without prompting a user or without a user having knowledge that any information is being exchanged for the purpose of offline MFA. For example, various information may be exchanged for offline MFA while network 420 is fully operational.

Figure 4A:
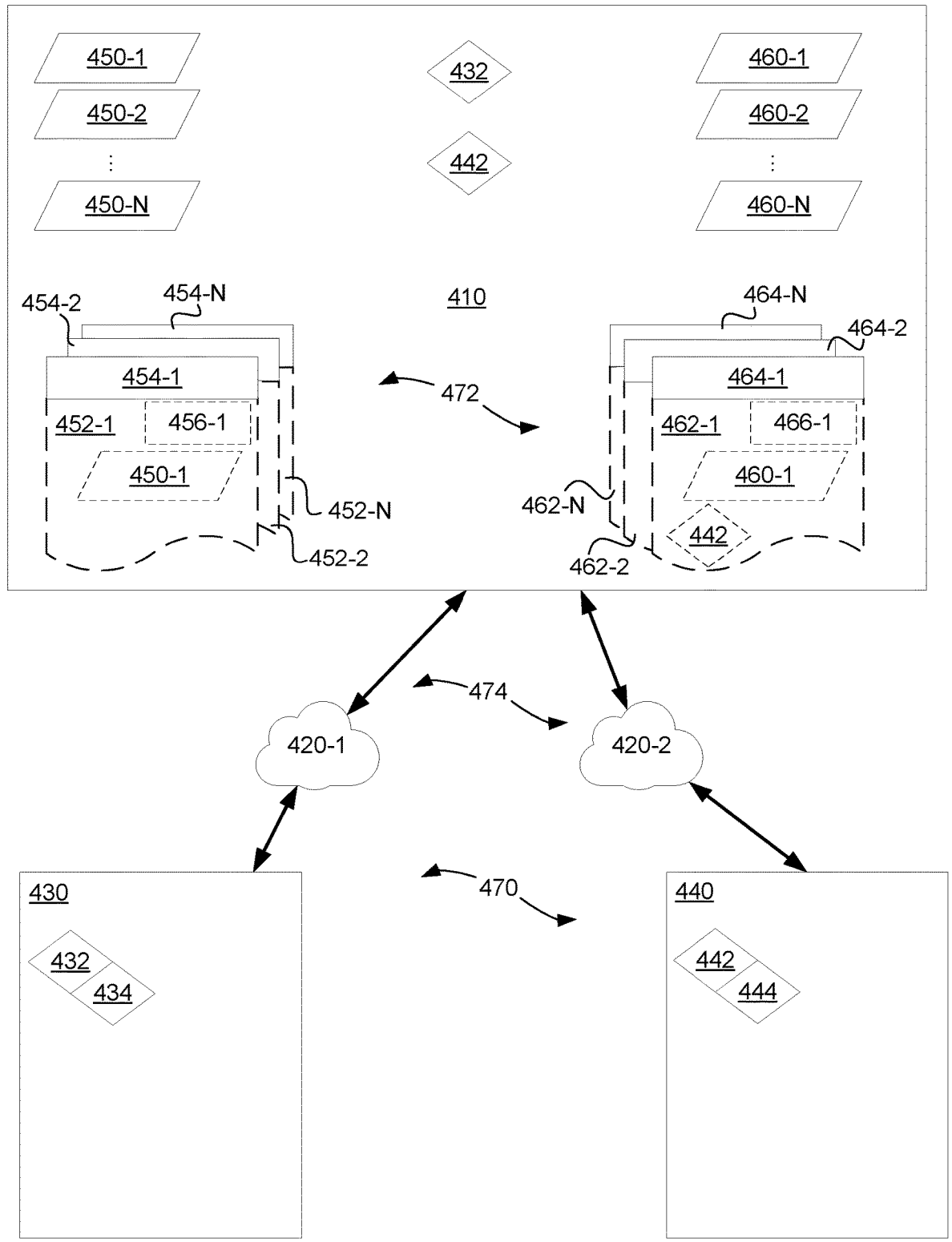
FIG. 4A depicts an example system configured to perform multi-factor authentication during network availability, consistent with some embodiments of the disclosure.

FIG. 4A depicts an example system 400 configured to perform multi-factor authentication during network availability, consistent with some embodiments of the disclosure. At time period 470, the authenticator app 430 and the target machine 440 may have network connectivity with the authentication server 410. Time period 470 may be a time that coincides with an active network communication, such as the target machine 440 and/or the authenticator app 430 sending (or receiving) a network packet to (or from) the authentication server 410. The time period 470 may be separate for each of the MFA devices. For example, time period 470 may be initiated by target machine 440 communicating availability to authentication server 410. Later, at a time after the initiation, authentication server 410 may send an online target status communication to authenticator app 430. For example, after receiving an availability status from target machine 440, authentication server 430 may transmit the online target status to authenticator app 430. At time period 470, the authenticator app 430 may also transmit public key 432 to authentication server 410; authentication server 410 may utilize public key 432 to generate encrypted files that only authenticator app 430 may be able to decrypt (e.g., using private key 434). At time period 470, the target machine 440 may also transmit public key 442 to authentication server 410; authentication server 410 may utilize public key 442 to generate encrypted files that only target machine 440 may be able to decrypt (e.g., using private key 444).

Online MFA operations may be performed at time period 470. For example, time period 470 may begin by target machine 440 receiving a request for a login (e.g., including receiving a username and password and validating the username and password). Responsive to receiving the request, target machine 440 may be configured to transmit a second factor request to authentication server 410. Responsive to receiving the second factor request, authentication server 410 may transmit a second factor to target machine 440 and also to authenticator app 430.

At time period 472, authentication server 410 may be configured to generate random values and encrypt the random values. Specifically, authentication server 410 may be configured to generate a set of authenticator random values 450-1, 450-2 up to 450-N (collectively, authenticator random values 450) and to generate a set of one or more target random values 460-1, 460-2 up to 460-N (collectively, target random values 460). In some embodiments, the random values (e.g., authenticator random values 450 and/or target random value 460) may be in the form of a passphrase that may be memorable or significant to a user. For example, authenticator random value 450-1 may be a passphrase such as "David has two dogs Jinx and Whisper", "Leo-enjoys-security-puzzles", or "Philip|once|hiked|a|mountain" or another series of letters, numbers, characters, or words. Further, authentication server 410 may be configured to encrypt the random values by generating, using one or more cryptographic algorithms, encrypted files that contain the random values. Specifically, authentication server 410 may be configured to generate a set of one or more authenticator encrypted files 452-1, 452-2 up to 452-N (collectively, authenticator encrypted files 452) and to generate a set of one or more target encrypted files 462-1, 462-2 up to 462-N (collectively, target encrypted files 462).

The encrypted files may be in a predefined format (e.g., a JavaScript Object Notation Web Token ("JWT")). The predefined format may include encrypted information (e.g., a payload) and non-encrypted information. In FIGS. 4A-4G, the encrypted portion may be indicated by dotted lines, and the non-encrypted portion may be indicated by solid lines.

Specifically, authenticator encrypted files 452 may include headers 454 that are non-encrypted. The headers 454 may include a unique identifier or index for identification of a particular authenticator encrypted file 452 e.g., authenticator encrypted file 452-1 may include header 454-1 having an index "001", authenticator encrypted file 452-2 may include header 454-2 having an index "002", and so on. The encrypted portions of the authenticator encrypted files 452 may contain the authenticator random values 450 e.g., authenticator encrypted file 452-1 may include authenticator random value 450-1, authenticator encrypted file 452-2 may include authenticator random value 450-2, and so on. The encrypted portions may also include an expiration value, such as expiration value 456-1 encrypted in authenticator encrypted file 452-1.

Likewise, target encrypted files 462 may include headers 464 that are non-encrypted. The headers 464 may include a unique identifier or index for identification of a particular target encrypted files 462 e.g., target encrypted file 462-1 may include header 464-1 having an index "001", target encrypted file 462-2 may include header 464-2 having an index "002", and so on. The headers 464 may correspond to the headers 454, such that a given header 464 has the same index or value as a given header 454. The encrypted portions of the target encrypted files 462 may contain the target random values 460 e.g., target encrypted file 462-1 may include target random value 460-1, target encrypted file 462-2 may include authenticator random value 460-2, and so on. The encrypted portions of the target encrypted files 462 may also include an expiration value, such as expiration value 466-1 encrypted in authenticator encrypted file 452-1. The encrypted portions of the target encrypted files 462 may also include the target machine public key 442.

The authenticator encrypted files 452 and the target encrypted files 462 may be encrypted using different cryptographic algorithms. For example, the authenticator app 430 may be configured to only decrypt encrypted files that are encrypted using a first cryptographic algorithm, and the target machine 440 may be configured to only decrypt encrypted files that are encrypted using a second cryptographical algorithm. Based on the compatibility of the authenticator app 430 and the target machine 440, the authenticator encrypted files 452 may be encrypted using the first cryptographic algorithm, and respectively, the target encrypted files 462 may be encrypted using the second cryptographic algorithm.

Each of the encrypted files may be encrypted using a value. Specifically, each authenticator encrypted file 452 may be encrypted with the authenticator public key 432. Further, each target encrypted file 462 may be encrypted with a corresponding authenticator random value 450, e.g., target encrypted file 462-1 may be encrypted with authenticator random value 450-1, target encrypted file 462-2 may be encrypted with authenticator random value 450-2, and so on.

At time period 474, the encrypted files may be transmitted to the other MFA devices. Time period 474 may a part of time period 472. Specifically, the authentication server 410 may transmit the authenticator encrypted files 452, generated at time period 472, to the authenticator app 430 through network 420-1. In some embodiments, the authentication server 410 may transmit public key 442 of target machine 440 to authenticator app 430 through network 420-1. Further, the authentication server 410 may transmit the target encrypted files 462 to the target machine 440 through network 420-2.

FIGS. 4B-4G may depict performance of multi-factor authentication outside of network availability. For example, FIGS. 4B-4G may depict multi-factor authentication between authenticator app 430 and target machine 440 without being able to communicate with authentication server 410, such as periods of time where network 420 is not operational or is not available. FIGS. 4B-4G may depict time periods 480, 482, 484, 486, 488, and 490, that may be serial or contemporaneous (e.g., time period 480 may occur before time period 482, time period 484 and time period 488 may occur partially or nearly contemporaneously).

Figure 4B:
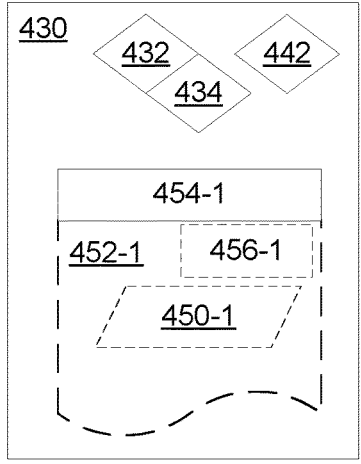
FIG. 4B depicts an example system performing multi-factor authentication outside of network availability, consistent with some embodiments of the disclosure.
Figure 4B:
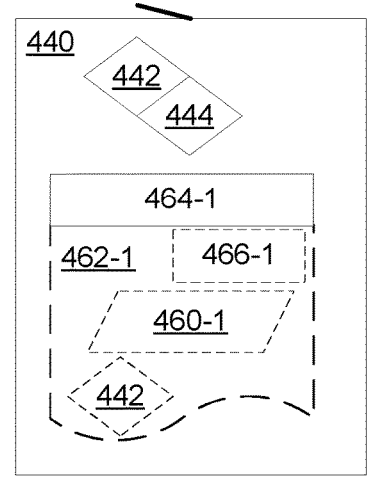

FIG. 4B depicts an example system 400 performing multi-factor authentication outside of network availability, consistent with some embodiments of the disclosure. FIG. 4B may occur after time period 470, such as at a time period after the authentication server 410 provided the authenticator encrypted files 452 to the authenticator app 430 and after the authentication server 410 provided the target encrypted files 462 to the target machine 440. At time period 480 the target machine 440 may attempt to communicate with authentication server 410 and may fail, such as due to a network outage or unavailability. Target machine 440 may attempt to communicate with authentication server 410, at time period 480, in response to receiving a valid login and password (or other valid first factor).

Figure 4C:
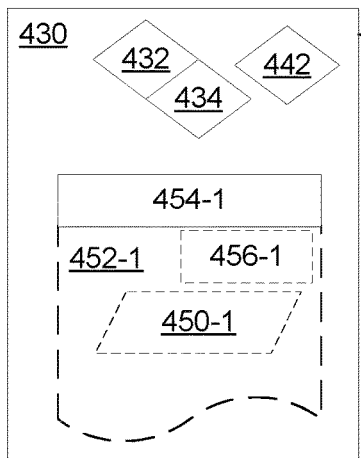
FIG. 4C depicts an example system performing multi-factor authentication outside of network availability, consistent with some embodiments of the disclosure.
Figure 4C:
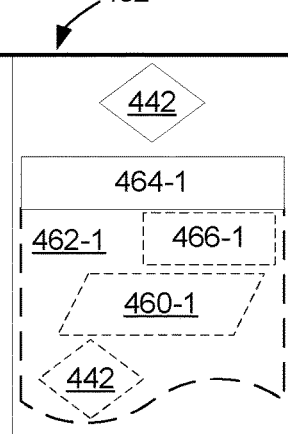
Figure 4C:
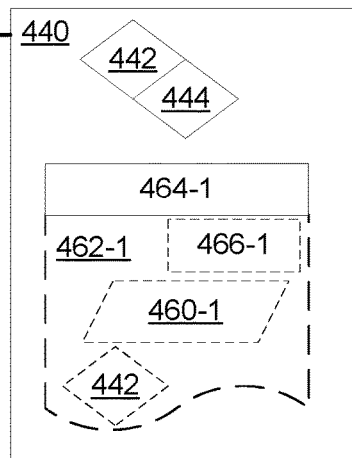

FIG. 4C depicts an example system 400 performing multi-factor authentication outside of network availability, consistent with some embodiments of the disclosure. At time period 482 target machine 440 may provide a copy of target encrypted file 462-1 to authenticator app 430. In some embodiments, providing a copy of target encrypted file 462-1 may also include cryptographically signing the copy. For example, the target machine 440 may cryptographically sign the copy of the target encrypted file 462-1 with private key 444. In some embodiments, at time period 482 target machine 440 may also provide a copy of target public key 442 to authenticator app 430. Providing by target machine 440 may be performed through a secondary network (not depicted), such as through a local network, a wireless network, a personal area network, or other relevant network. Providing by target machine 440 may be performed visually. For example, target machine 440 may include a display (not depicted) that is capable of providing a graphical user interface (GUI) for a user. Target machine 440 may generate a machine-readable image that represents the target encrypted file 462-1 and/or the target public key 442 (e.g., a barcode, a two-dimensional bar code, a matrix barcode, a quick response code). The machine-readable image may be displayed through the display of the target machine 440, such that a secondary computer with an included digital camera (not depicted) that executes the authenticator app 430 may capture the target encrypted file 462-1 and/or the target public key 442.

Figure 4D:
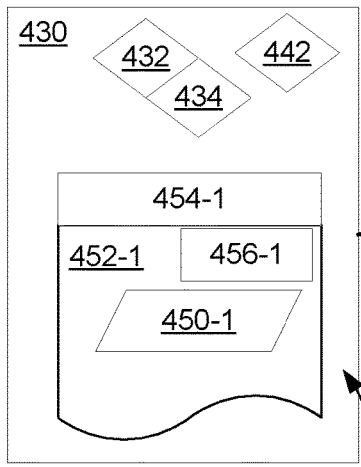
FIG. 4D depicts an example system performing multi-factor authentication outside of network availability, consistent with some embodiments of the disclosure.
Figure 4D:
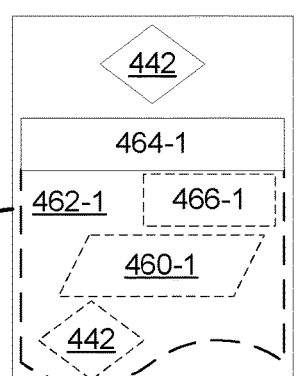
Figure 4D:
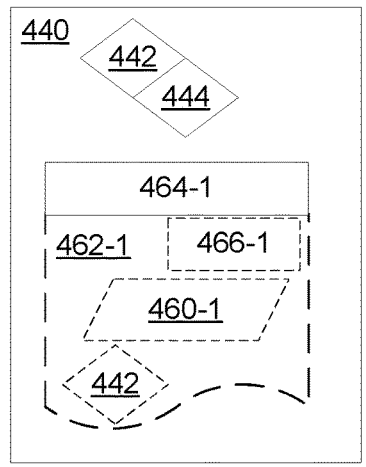

FIG. 4D depicts an example system 400 performing multi-factor authentication outside of network availability, consistent with some embodiments of the disclosure. At time period 484 the authenticator app 430 may decrypt, using authenticator private key 434, the authenticator encrypted file 452-1. The authenticator app 430 may select authenticator encrypted file 452-1 to decrypt, based on the received target encrypted file 462-1. For example, the authenticator app 430, may identify an index value in header 464-1 of target encrypted file 462-1 and may match the index value to a corresponding index value in header 454-1 in authenticator encrypted file 452-1. Upon decrypting the authenticator encrypted file 452-1, the authenticator app 430 may have access to the authenticator random value 450-1 and expiration value 456-1. The authenticator app 430 may be configured to determine if authenticator encrypted file 452-1 is expired, by comparing the expiration value 456-1 to a time value (e.g., system time of a computer system that executes authenticator app 430). If the expiration value 456-1 is less than the time value, the authenticator app 430 may continue CRMFA. If the expiration value 456-1 is equal to or greater than the time value, the authenticator app 430 may not continue CRMFA. If the expiration value 456-1 is equal to or greater than the time value, the authenticator app 430 may request a new target encrypted file 460 from the target machine 440.

Figure 4E:
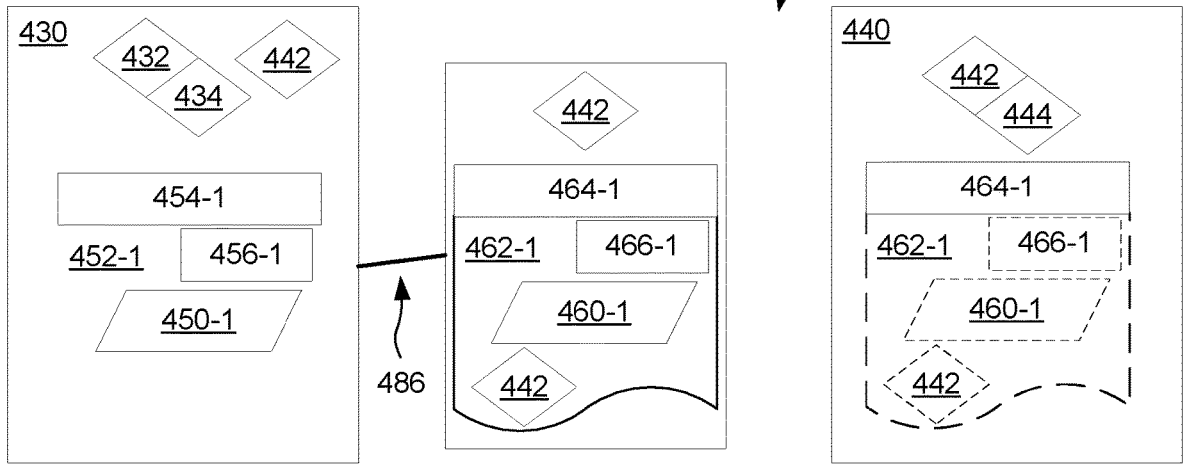
FIG. 4E depicts an example system performing multi-factor authentication outside of network availability, consistent with some embodiments of the disclosure.

FIG. 4E depicts an example system 400 performing multi-factor authentication outside of network availability, consistent with some embodiments of the disclosure. At time period 486 the authenticator app 430 may decrypt, using the authenticator random value 450-1, the target encrypted file 462-1. Further, the authenticator app 430 may validate the target encrypted file 462-1. Specifically, the authenticator app 430 may compare the target public key 442, received at time period 482, with the target public key 442, decrypted at time period 486 (e.g., if the target public keys match, the authenticator app 430 may determine that the target encrypted file 462-1 has not been modified since being provided by the authentication server 410). In some embodiments, the authenticator app 430 may validate the target encrypted file 462-1 using a digital signature algorithm (e.g., RSA, DSA). For example, the authenticator app 430 may be configured to perform a cryptographic verification of the target encrypted file 462-1 using public key 442 received from authentication server 410. Upon decrypting the target encrypted file 462-1, the authenticator app 430 may have access to the target random value 460-1.

Figure 4F:
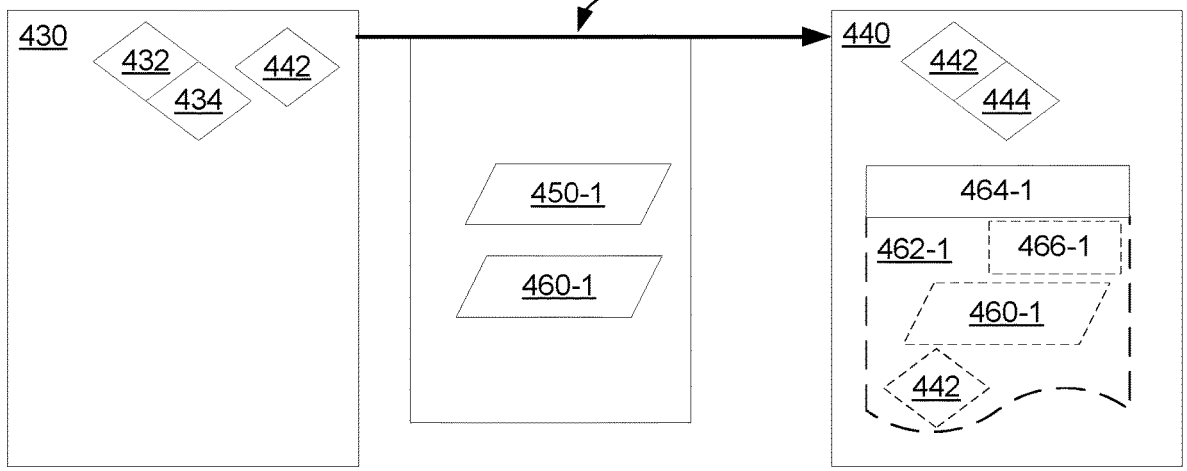
FIG. 4F depicts an example system performing multi-factor authentication outside of network availability, consistent with some embodiments of the disclosure.

FIG. 4F depicts an example system 400 performing multi-factor authentication outside of network availability, consistent with some embodiments of the disclosure. At time period 488, the authenticator app 430 may provide the random values to the target machine 440. Specifically, the authenticator app 430 may directly transmit the authenticator random value 450-1 and the target random value 460-1 to the target machine 440. For example, the authenticator app 430 may establish a network connection, such as a wireless network connection, with the target machine 440 for transmission of the random values. The authenticator app 430 may indirectly provide the authenticator random value 450-1 and the target random value 460-1 to the target machine 440. Specifically, the authenticator app 430 may be operating on a client device (e.g., smartphone) of a user. The authenticator app 430 may render on a display (not depicted) of the client device both the authenticator random value 450-1 and the target random value 460-1. The user may read the display of the client device to enter the authenticator random value 450-1 and the target random value 460-1 into a keyboard (not depicted) of the target machine 440.

Figure 4G:
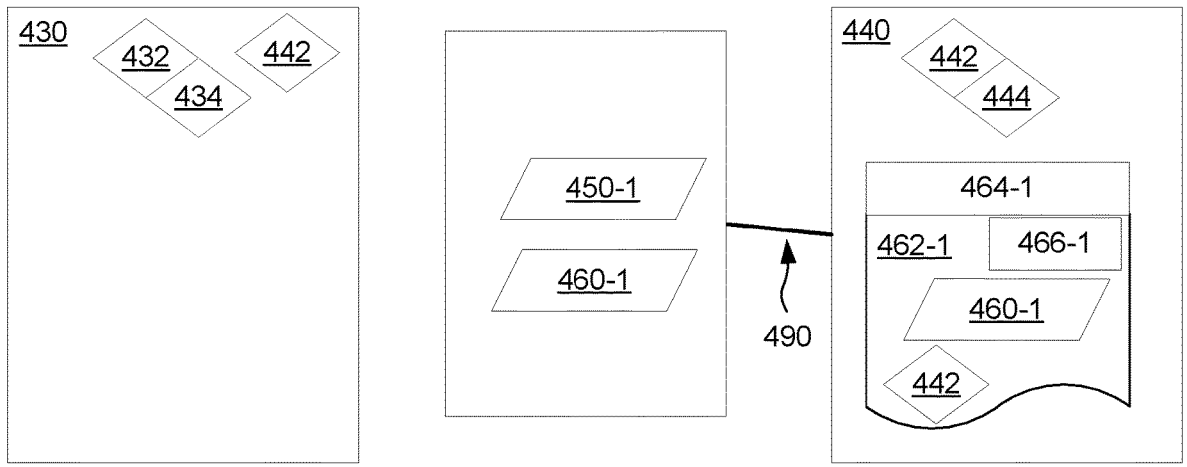
FIG. 4G depicts an example system performing multi-factor authentication outside of network availability, consistent with some embodiments of the disclosure.

FIG. 4G depicts an example system 400 performing multi-factor authentication outside of network availability, consistent with some embodiments of the disclosure. At time period 490 the target machine 440 may utilize the authenticator random value 450-1 to decrypt the target encrypted file 462-1. The target machine may utilize the decrypted target encrypted file 462-1 to retrieve the expiration value 466-1 and determine if the target encrypted file 462-1 is expired (e.g., if the expiration value 466-1 is a date/timestamp that is before a current time). If the target encrypted file 462-1 is not expired, the target machine 440 may authenticate the second factor by comparing the provided version of the target random value 460-1 (provided by the authenticator app 430) to the decrypted version of the target random value 460-1. If the provided version of the target random value 460-1 and the decrypted version of the target random value 460-1 match, then the target machine 460-1 may validate the login request, and consequently, unlocking the target machine 460-1 (e.g., permitting the login request).

Figure 5:
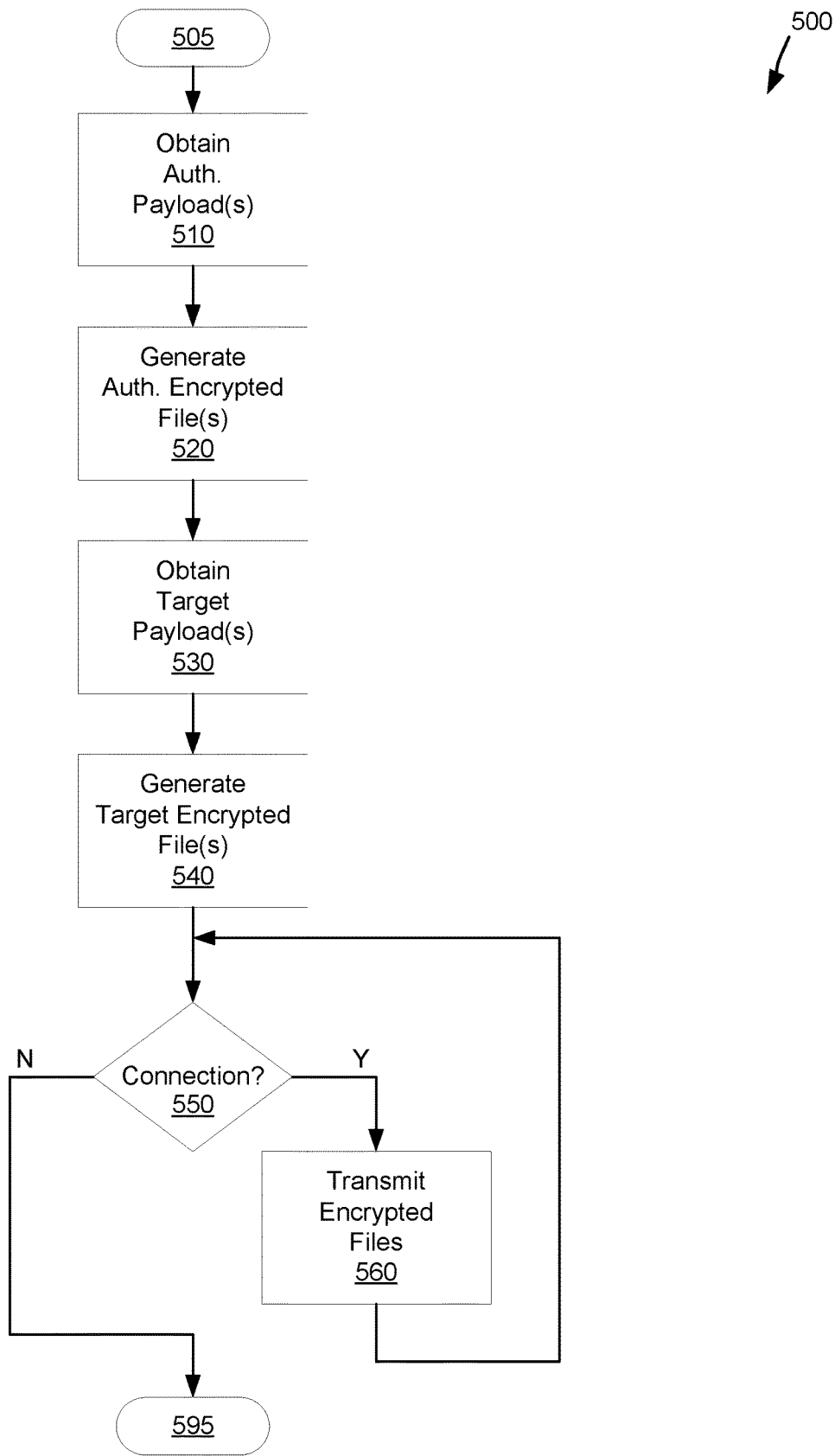
FIG. 5 depicts an example method of multi-factor authentication by an authentication server, consistent with some embodiments of the disclosure.

FIG. 5 depicts an example method 500 of multi-factor authentication by an authentication server, consistent with some embodiments of the disclosure. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 500 may be performed by an authentication server, such as authentication server 410.

From start 505, an authenticator payload may be obtained at 510. The authenticator payload may be obtained by receiving an authenticator random value from a random number generator. The authenticator payload may be obtained by generating a random value directly. The authenticator payload may be obtained by appending other values to the authenticator random value, such as an expiration value. In some embodiments, multiple authenticator payloads may be obtained, each payload having a different authenticator random value. The authenticator payload may be obtained in response to receiving a request for performance of an online MFA, such as receiving a request for a second factor from an authenticator app and/or a target machine.

At 520 an authenticator encrypted file may be generated. The authenticator encrypted file may be generated by performing a cryptographic algorithm, such as a hashing algorithm. The authenticator payload may be provided as input to the cryptographic algorithm. Consequently, the authenticator encrypted file may include the authenticator payload. The authenticator payload may be encrypted using a public-key algorithm. Specifically, the authenticator payload may be encrypted with a public key and may be able to be decrypted with a corresponding private key. The public key may be related to an authenticator application (e.g., a public key of an authenticator application, and decryptable by a corresponding private key in possession of the authenticator application). In some embodiments, multiple authenticator encrypted files may be generated, where each authenticator encrypted file is for encrypting a different authenticator payload.

At 530 a target payload may be obtained. The target payload may be obtained by receiving a target random value from a random number generator. The target payload may be obtained by generating a random value directly. In some embodiments, multiple target payloads may be obtained, each payload having a different target random value. The target payload may be obtained by appending other values to the target random value, such as an expiration value. The expiration value appended to the target random value may be the same as the expiration value appended to the authenticator random value. The target payload may be obtained in response to receiving a request for performance of an online MFA, such as receiving a request for a second factor from an authenticator app and/or a target machine.

At 540 a target encrypted file may be generated. The target encrypted file may be generated by performing a cryptographic algorithm, such as a hashing algorithm. The cryptographic algorithm that is part of the generation at 540 may be the same cryptographic algorithm that is part of the generation at 520. The target payload may be provided as input to the cryptographic algorithm. Consequently, the target encrypted file may include the target payload. The target payload may be encrypted using the random value obtained at 510. For example, the target encrypted file may be encrypted with the authenticator random value. In some embodiments, multiple target encrypted files may be generated, each target encrypted file for encrypting a different target payload.

At 550 a network connection may be identified. A network connection may be from an authenticator application, such as a cellular network receiving a request from a client device to connect an authenticator network (e.g., an authenticator network connection). A network connection may be from a target machine, such as a network receiving a request from a target machine to connect a target network (e.g., a target network connection). The network connection may be facilitating communication between the authentication server and one or more other MFA devices (e.g., an authenticator app, a target machine). The network connection may be concurrent with other network connections, such as while another network connection with another MFA device is active. If the network connection is identified, at 550:Y, the encrypted files may be transmitted at 560. After the transmission of encrypted files, at 560, method 500 may continue by monitoring to identify network connections at 550. If there is no network connection identified, at 560:N, method 500 may end at 595.

Figure 6:
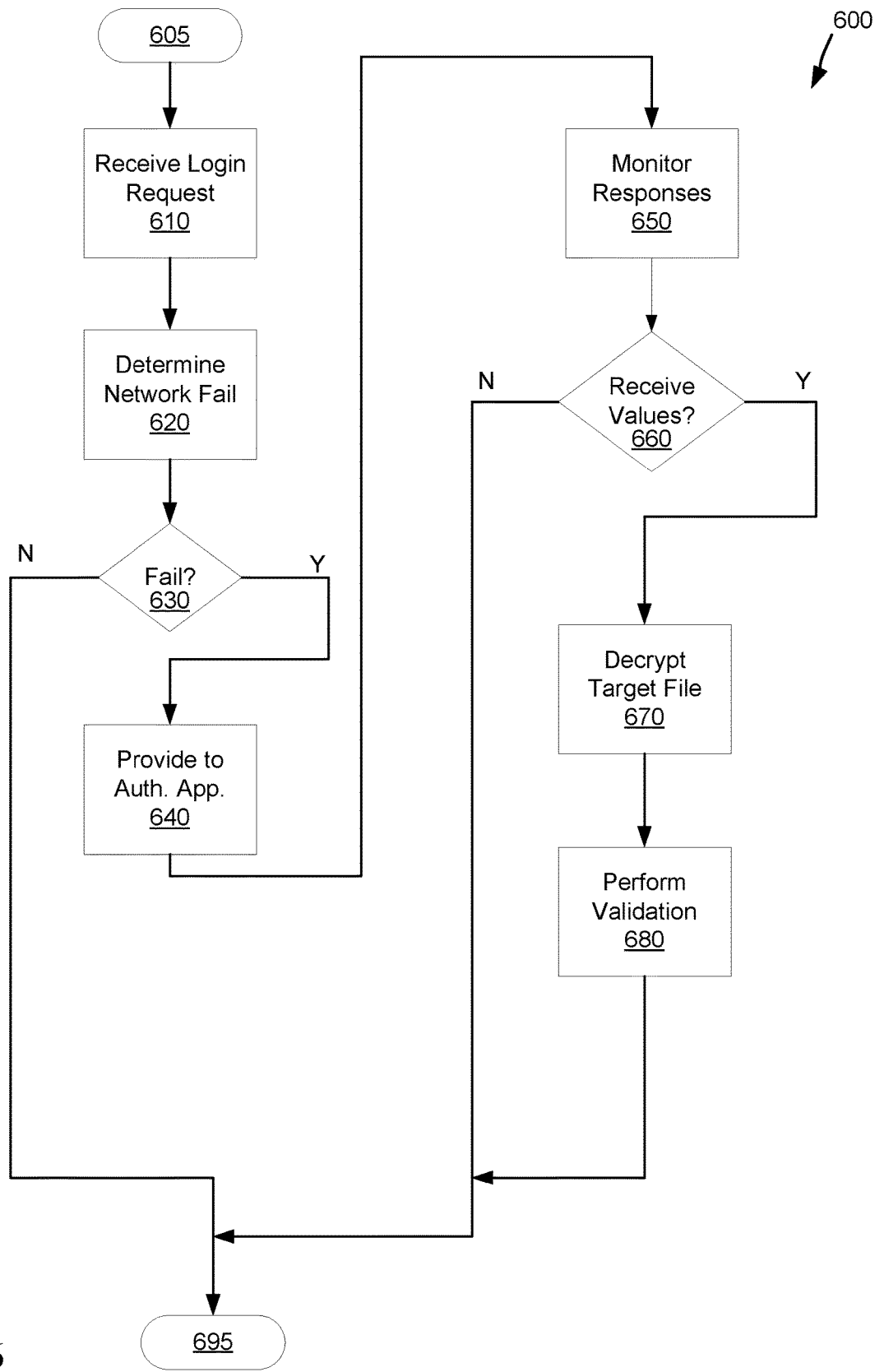
FIG. 6 depicts an example method of multi-factor authentication by a target machine, consistent with some embodiments of the disclosure.

FIG. 6 depicts an example method 600 of multi-factor authentication by a target machine, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 600 may be performed by a target machine, such as target machine 440.

From start 605, a login request may be received at 610. The login request may include a first factor, such as an identifier and a password. The login request may be from a user, such as a user typing in a username and password into a login prompt provided by the target machine. The login request may be from a secondary computer. For example, a smartphone may operate by transmitting an access request to a target machine through a local area network or personal area network. The first factor may be validated, such as performing a validation of the username and password.

At 620, a network failure may be determined. The network failure may be an inability of a target machine to communicate with an authentication server. Specifically, a target machine may attempt to contact an authentication server. For example, the target machine may, responsive to the login request, attempt to establish a network connection with the authentication server for the purpose of requesting a second factor, to perform an online MFA operation. The network failure may be that the target machine does not receive a response from the authentication server, such as the authentication server is temporarily offline. The network failure may be that the target machine cannot send a communication to the authentication server, such as the target machine does not have network access, or the target machine cannot transmit network packets to the authentication server.

If there is not a network failure, at 630:N, method 600 may end at 695. If there is a network failure, at 630:Y, method 600 may continue by providing a copy of a target encrypted file to an authenticator application at 640. Providing a copy of the target encrypted file, may include establishing a network connection with a client app (e.g., an authenticator app) running on a secondary client device (e.g., a laptop computer of a user). Providing the copy of the target encrypted file, may include transmitting the copy through the local area network that was the source of the access and/or login request (e.g., a Wi-Fi connection, a Bluetooth connection). Providing the copy of the target encrypted file may include selecting a target encrypted file from a set of target encrypted files stored on the target machine. The selection may be based on an unencrypted portion of a target encrypted file, such as an index. Providing a copy of the target encrypted file may include providing a target machine public key (e.g., a public key of the target machine provided to other computing devices for performing public-key encrypted communication). Providing a copy of a target encrypted file to an authenticator application may include rendering a quick response code (or other visual representation) of the target encrypted file to facilitate a capture by the client computer that is operating the authenticator app.

At 650 a target machine may monitor for a response. The monitoring for responses may be through a network connection with an authenticator app. The monitoring for responses may be for monitoring for input from an input device of the target machine (e.g., mouse movement, keyboard keystrokes, touchscreen input). The monitoring for responses may include monitoring for responses that contain random values, such as an authenticator random value and a target random values. The type of responses may be predetermined based on CRMFA application programming interfaces (API). For example, a first API may specify that a first string or series of values is to be an authenticator random value and a second string or series of values is to be a target random value. The first API may also specify that a predetermined character or string is to be used as a separator, such as a period or comma. The first API may also specify a specific length of characters that is to be used for various random values. If a response is received that does not contain a random values, at 660:N, method 600 may end at 695.

If a response is received that contains a random value, at 660:N, method 600 may continue at 670 by performing a decryption operation. The decryption operation may be performed using a random value received from an authenticator app (e.g., an authenticator random value). The decryption operation may be performed against a target encrypted file. A payload of the target encrypted file may be obtained based on performing the decryption operation, a target payload. The target payload may contain the target random value. At 680 a validation operation may be performed. The validation operation may include comparing the target random value that is received to the target random value that was encrypted in the target encrypted file. The validation operation may also include unlocking the target machine. Specifically, unlocking the target machine based on the two copies of the target random value being the same. After performing the validation operation at 680, method 600 may end at 695.

Figure 7:
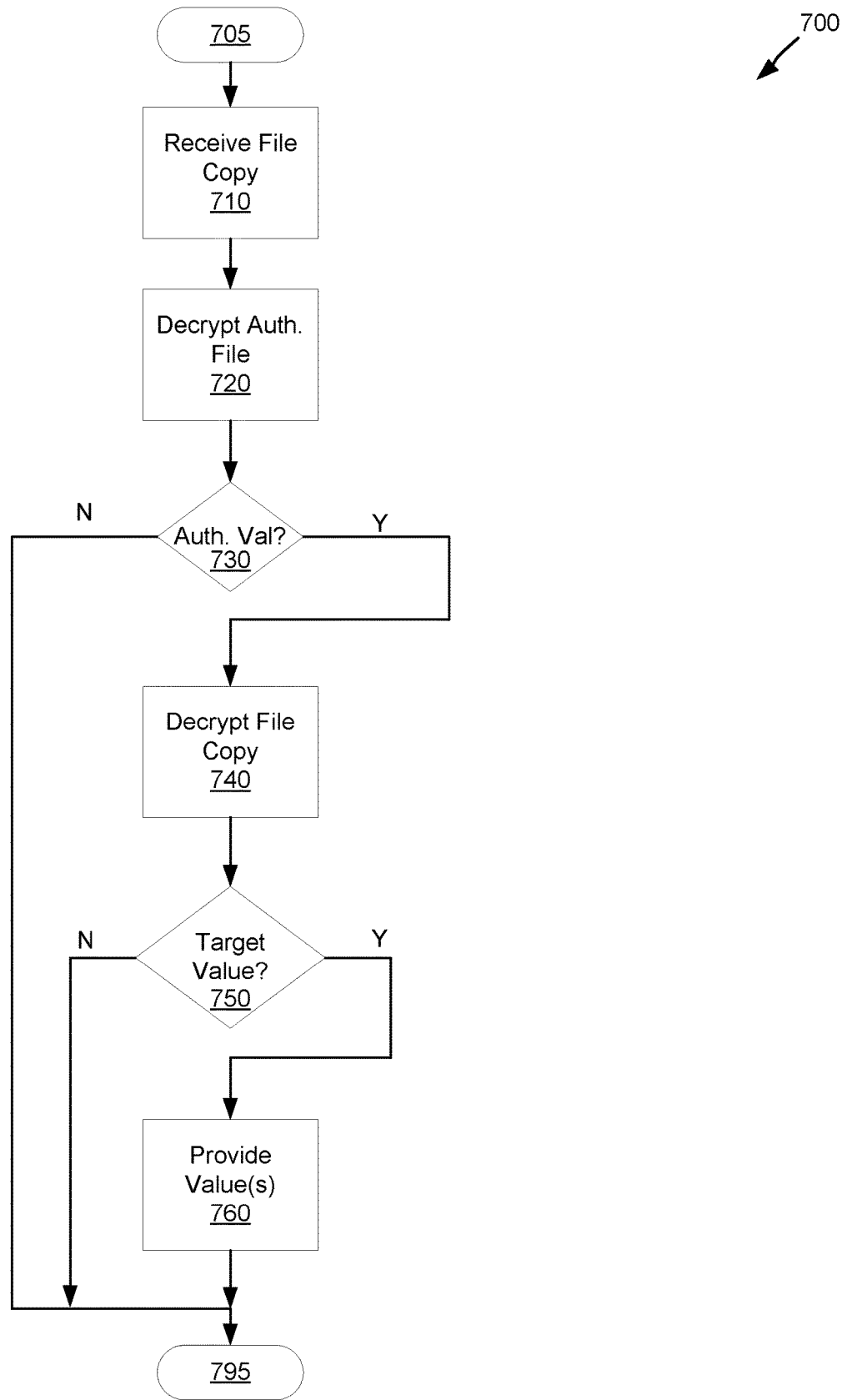
FIG. 7 depicts an example method of multi-factor authentication by an authentication application, consistent with some embodiments of the disclosure.

FIG. 7 depicts an example method 700 of multi-factor authentication by an authentication application, consistent with some embodiments of the disclosure. Method 700 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 700 may be performed by a client device, and in particular an application configured to perform authentication, such as CRMFA (e.g., authenticator app 430).

From start 705, an encrypted file copy ("file copy") may be received by an authenticator app at 710. For example, a target machine may transmit, responsive to a login request, the file copy to a client device that is configured to execute the authenticator app. The file copy may be received through a network. For example, the file copy may be transmitted through a network connection between a target machine and the authenticator app. The file copy may be received without a network connection. For example, the bits of data that make up the encrypted file copy may be rendered by a display of a target machine, and a camera communicatively coupled to the client device may capture the bits of data.

At 720, an authenticator encrypted file may be decrypted. Specifically, a decryption algorithm may be employed to decrypt an authenticator encrypted file stored by the client device that executes the authenticator app. The authenticator encrypted file may be decrypted using public-key decryption (e.g., a decryption algorithm may employ a private key stored by the authenticator app). The authenticator encrypted file may be decrypted to determine an authenticator random value for use in decrypting the received file copy. Specifically, the authenticator encrypted file may contain an authenticator random value that was used by an authentication server to encrypt the target encrypted file (and as a result, the copy of the target encrypted file). If the authenticator random value is not determined, at 730:N, method 700 may end at 795.

If the authenticator random value is determined, at 730:Y, the file copy may be decrypted at 740. Specifically, a decryption operation may be performed to successfully decrypt the target encrypted file copy. The key for the target encrypted file copy may be the authenticator random value, and the authenticator app may utilize a decryption algorithm by providing the target encrypted file copy and the authenticator random value as inputs to the decryption algorithm. The decryption of the file copy may include determining a target random value. Specifically, based upon decrypting the target encrypted file copy, a target payload that includes a target random value may be obtained. If the target random value is not determined, at 750:N, method 700 may end at 795.

If the target random value is determined, at 750:Y, method 700 may continue by providing the random values to the target machine at 760. Providing the random values may include generating a string or other data structure. Specifically, a predefined API may specify a particular data structure or other relevant format for presenting the random values. For example, given an authenticator random value of "3470234" and a target random value of "HE0O923N", a value of "3470234.HE0O923N" may be a compliant format for providing to the target machine. Providing the random values may include providing the random values to a user, such as displaying on a display of the client device that executes the authenticator app. Providing the random values may include transmitting two separate messages in a predefined order. For example, a target machine and an authenticator application may agree on a scheme of network communication that specifies sending a first network transmission that includes the authenticator random value, and a second network transmission that includes the target random value, or vice versa. After the random values are provided by the authenticator app, at 760, method 700 may end at 795.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
obtaining a first authenticator payload that includes a first authenticator random value;
generating, based on a first cryptographic algorithm and with an authenticator public key, a first authenticator encrypted file, wherein the first authenticator encrypted file includes the first authenticator payload, wherein the authenticator public key is related to a client authenticator application;
obtaining a first target payload that includes a first target random value;
generating, based on a second cryptographic algorithm and with the first authenticator random value, a first target encrypted file, wherein the first target encrypted file includes the first target payload;
wherein the client authenticator application is configured to permit decryption of the first target encrypted file based upon the first authenticator payload in an absence of a network connection between the client authenticator application and a target machine having the first target encrypted file, and wherein if an expiration value associated with the first target encrypted file or the first authenticator encrypted file is expired, then the client authenticator application is configured to invalidate, or delete, all data associated with the first target encrypted file; and
generating a new set of encrypted files, proactively, when the network connection is restored.

2. The method of claim 1, wherein the method further comprises:
identifying, by an authentication server, an authenticator network connection with the client authenticator application;
transmitting, by the authentication server and in response to the authenticator network connection, the first authenticator encrypted file to the client authenticator application;
identifying, by the authentication server, a target network connection with the target machine; and transmitting, by the authentication server and in response to the target network connection, the first target encrypted file to the target machine.

3. The method of claim 2, wherein the target network connection is identified concurrently with the identification of the authenticator network connection.

4. The method of claim 2, wherein the method further comprises:
  receiving, by the target machine, a login request,
    wherein the login request includes a valid identifier, and
    wherein the login request includes a valid password;
  determining, by the target machine, a network failure, wherein the network failure includes the inability of the target machine to communicate with the authentication server; and
  providing, by the target machine and to the client authenticator application, a first copy of the first target encrypted file.

5. The method of claim 4, wherein the first target encrypted file contains a first target machine public key copy of a target machine public key, and wherein the providing the first copy of the first target encrypted file comprises:
  providing, by the target machine and to the client authenticator application, a second target machine public key copy of the target machine public key, and
  wherein upon decryption of the first target encrypted file the authenticator application is configured to compare the first target machine public key copy of a target machine public key and the second target machine public key copy of the target machine public key.

6. The method of claim 4, wherein the method further comprises:
  receiving, by the client authenticator application, the first copy of the first target encrypted file;
  performing, by the client authenticator application and based on an authenticator private key, a first decryption operation on the first authenticator encrypted file, wherein the authenticator private key corresponds to the authenticator public key;
  determining, by the client authenticator application and based on the first decryption operation, the first authenticator random value;
  performing, by the client authenticator application and based on the first authenticator random value, a second decryption operation on the first copy of the first target encrypted file;
  determining, by the client authenticator application and based on the second decryption operation, the first target random value of the first copy of the target encrypted file; and
  providing, by the client authenticator, the first authenticator random value and the first target random value of the first copy of the first target encrypted file.

7. The method of claim 6, wherein the client authenticator application includes a screen configured to display information to a user, and wherein the providing the first authenticator random value and the first target random value comprises:
  displaying, by the screen, the first authenticator random value and the first target random value.

8. The method of claim 6, wherein the method further comprises:
  receiving, by the target machine and from the client authenticator application, the first authenticator random value and the first target random value of the first copy of the first target encrypted file;
  performing, by the target machine and based on the first authenticator random value, a third decryption operation on the first target encrypted file;
  determining, by the target machine and based on the third decryption operation, the first target random value of the first target encrypted file; and
  performing, by the target machine, a validation operation by comparing the first target random value of the first target encrypted file to the first target random value of the first copy of the first target encrypted file.

9. The method of claim 8, wherein the validation operation includes determining that the first target random value of the first target encrypted file matches first target random value of the first copy of the first target encrypted file, and wherein the method further comprises:
  unlocking, by the target machine and based on the login request and based on the validation operation, the target machine.

10. The method of claim 8, wherein the first target encrypted file includes a first expiration value, and wherein the validation operation comprises:
  determining, by the target machine based on the first expiration value, an expiration status of the first target encrypted file.

11. The method of claim 9, wherein the first expiration value is a part of the first target payload, and wherein the determining the expiration status of the first target encrypted file occurs after the third decryption operation.

12. The method of claim 1, wherein the first cryptographic algorithm is the same as the second cryptographic algorithm.

13. The method of claim 1, wherein the obtaining the first authenticator payload is in response to receiving a request for an online multi-factor authentication from the target machine.

14. The method of claim 13, wherein the method further comprises:
  notifying, by an authentication server, the client authenticator application of the first authenticator encrypted file.

15. The method of claim 1, wherein the method further comprises:
  obtaining a second authenticator payload that includes a second authenticator random value;
  generating, based on a second cryptographic algorithm and with the authenticator public key, a second authenticator encrypted file, wherein the second authenticator encrypted file includes the second authenticator payload;
  obtaining a second target payload that includes a second target random value; and
  generating, based on a second cryptographic algorithm and with the second authenticator random value, a second target encrypted file, wherein the second target encrypted file includes the second target payload.

16. The method of claim of claim 15, wherein the method further comprises:
  identifying, by an authentication server, an authenticator network connection with the client authenticator application;
  transmitting, by the authentication server and in response to the authenticator network connection, the first authenticator encrypted file and the second authenticator encrypted file to the client authenticator application;
  identifying, by the authentication server, a target network connection with a target machine; and transmitting, by the authentication server and in response to the target network connection, the first target encrypted file and the second target encrypted file to the target machine.

17. A system, the system comprising:
a memory, the memory containing one or more instructions; and
a processor, the processor communicatively coupled to the memory, the processor, in response to reading the one or more instructions, configured to:
obtain a first authenticator payload that includes a first authenticator random value;
generate, based on a first cryptographic algorithm and with an authenticator public key, a first authenticator encrypted file, wherein the first authenticator encrypted file includes the first authenticator payload, wherein the authenticator public key is related to a client authenticator application;
obtain a first target payload that includes a first target random value;
generate, based on a second cryptographic algorithm and with the first authenticator random value, a first target encrypted file, wherein the first target encrypted file includes the first target payload;
wherein the client authenticator application is configured to permit decryption of the first target encrypted file based upon the first authenticator payload in an absence of a network connection between the client authenticator application and a target machine having the first target encrypted file, and wherein if an expiration value associated with the first target encrypted file or the first authenticator encrypted file is expired, then the client authenticator application is configured to invalidate, or delete, all data associated with the first target encrypted file; and
generating a new set of encrypted files, proactively, when the network connection is restored.

18. The system of claim 17, wherein the obtain the first authenticator payload is in response to receiving a request for an online multi-factor authentication from the target machine.

19. A computer program product, the computer program product comprising:
one or more computer readable storage media; and
program instructions collectively stored on the one or more computer readable storage media, the program instructions configured to:
obtain a first authenticator payload that includes a first authenticator random value;
generate, based on a first cryptographic algorithm and with an authenticator public key, a first authenticator encrypted file, wherein the first authenticator encrypted file includes the first authenticator payload, wherein the authenticator public key is related to a client authenticator application;
obtain a first target payload that includes a first target random value;
generate, based on a second cryptographic algorithm and with the first authenticator random value, a first target encrypted file, wherein the first target encrypted file includes the first target payload;
wherein the client authenticator application is configured to permit decryption of the first target encrypted file based upon the first authenticator payload in an absence of a network connection between the client authenticator application and a target machine having the first target encrypted file, and wherein if an expiration value associated with the first target encrypted file or the first authenticator encrypted file is expired, then the client authenticator application is configured to invalidate, or delete, all data associated with the first target encrypted file; and
generating a new set of encrypted files, proactively, when the network connection is restored.

20. The computer program product of claim 19, wherein the obtain the first authenticator payload is in response to receiving a request for an online multi-factor authentication from the target machine.

* * * * *